United States Patent
Neubach et al.

(10) Patent No.: US 10,273,652 B2
(45) Date of Patent: Apr. 30, 2019

(54) CUTTING TOOL

(71) Applicant: Tyrolit-Schleifmittelwerke Swarovski K.G., Schwaz (AT)

(72) Inventors: Stefan Neubach, Schwaz (AT); Karl Moller, Wellington, FL (US)

(73) Assignee: TYROLIT—SCHLEIFMITTELWERKE SWAROVSKI K.G., Schwaz (AT)

( * ) Notice: Subject to any disclaimer, the term of this patent is extended or adjusted under 35 U.S.C. 154(b) by 0 days.

(21) Appl. No.: 15/696,615

(22) Filed: Sep. 6, 2017

(65) Prior Publication Data

US 2018/0073218 A1    Mar. 15, 2018

(30) Foreign Application Priority Data

Sep. 12, 2016  (AT) .............................. A 50806/2016

(51) Int. Cl.
*E02F 5/08* (2006.01)
*E02F 5/14* (2006.01)
(Continued)

(52) U.S. Cl.
CPC ............... *E02F 5/08* (2013.01); *B23D 45/10* (2013.01); *B28D 1/121* (2013.01); *E02F 3/148* (2013.01); *E02F 3/188* (2013.01); *E02F 3/241* (2013.01); *E02F 5/14* (2013.01); *E02F 5/10* (2013.01); *F16L 1/028* (2013.01); *H02G 1/06* (2013.01)

(58) Field of Classification Search
CPC ...... A01G 23/067; A01G 23/00; A01G 23/06; E02F 3/188; E02F 3/20; E02F 3/246; E02F 3/248; E02F 3/241; E02F 5/08; E02F 5/12; E02F 5/10; E02F 5/14; E02F 3/148;
(Continued)

(56) References Cited

U.S. PATENT DOCUMENTS 2,934,841 A    5/1960  Tibbits, Jr.
3,162,187 A   12/1964  Christensen
(Continued)

FOREIGN PATENT DOCUMENTS

AU    2004205285    9/2004
DE    23 42 217     3/1975
(Continued)

OTHER PUBLICATIONS

Austrian Search Report dated Jun. 20, 2017 in Austrian Patent Application No. A 50806/2016 with English translation.
(Continued)

*Primary Examiner* — Robert E Pezzuto
(74) *Attorney, Agent, or Firm* — Wenderoth, Lind & Ponack, L.L.P.

(57) ABSTRACT

A cutting tool (1) for producing a trench (2) in the ground (3) for laying cables (4), comprises a carrier device (5) which has a hub region (6) for connecting the cutting tool (1) to a rotary drive (7) and a peripheral region (8), wherein, arranged in the peripheral region (8) of the carrier device (5) are cutting segments (9) spaced from each other in an axial direction (10), wherein the carrier device (5) is in one piece and has a peripheral surface (11) at which are arranged raised portions (12, 13) which project from the peripheral surface (11) in a radial direction (14) and on which the cutting segments (9) are arranged.

20 Claims, 4 Drawing Sheets

(51) Int. Cl.
  *B23D 45/10*  (2006.01)
  *B28D 1/12*  (2006.01)
  *E02F 3/14*  (2006.01)
  *E02F 3/18*  (2006.01)
  *E02F 3/24*  (2006.01)
  *E02F 5/10*  (2006.01)
  *F16L 1/028*  (2006.01)
  *H02G 1/06*  (2006.01)

(58) Field of Classification Search
  CPC ......... E02F 3/085; B23D 45/10; B28D 1/121; A01B 33/028
  USPC ............. 37/94, 91, 352, 355, 189, 403, 302; 299/39.4
  See application file for complete search history.

(56) References Cited

U.S. PATENT DOCUMENTS

| | | | |
|---|---|---|---|
| 3,451,721 A | 6/1969 | Highberg et al. | |
| 3,860,292 A | 1/1975 | Bechem | |
| 4,041,996 A * | 8/1977 | Grover | A01G 23/067 144/218 |
| 4,179,829 A | 12/1979 | Kinkade | |
| 4,736,987 A | 4/1988 | Lenzen et al. | |
| 4,794,709 A * | 1/1989 | Rivard | E02F 3/188 37/91 |
| 5,285,768 A | 2/1994 | Messina | |
| 5,320,451 A * | 6/1994 | Garvey | E02F 5/10 405/174 |
| 5,378,049 A | 1/1995 | Fleischhaker et al. | |
| 5,419,380 A * | 5/1995 | Bot | A01G 23/067 144/208.92 |
| 6,047,749 A * | 4/2000 | Lamb | A01G 23/067 144/218 |
| 6,438,874 B1 | 8/2002 | LaBounty et al. | |
| 6,638,152 B1 | 10/2003 | Kim et al. | |
| 7,178,517 B1 | 2/2007 | Yu | |
| 9,267,620 B2 | 2/2016 | Sjodahl et al. | |
| 2008/0267706 A1 | 10/2008 | Hall et al. | |
| 2009/0007460 A1 | 1/2009 | Greenlee et al. | |
| 2012/0328370 A1 | 12/2012 | Gustafsson et al. | |
| 2014/0079487 A1 | 3/2014 | Sjodahl et al. | |
| 2016/0130781 A1 | 5/2016 | Gustafsson et al. | |

FOREIGN PATENT DOCUMENTS

| | | |
|---|---|---|
| EP | 1 129 824 | 9/2001 |
| EP | 2 518 217 | 10/2012 |
| FR | 2 611 768 | 9/1988 |
| FR | 2 732 051 | 9/1996 |
| KR | 10-2006-0040419 | 5/2006 |
| WO | 2006/029480 | 3/2006 |
| WO | 2012/102659 | 8/2012 |

OTHER PUBLICATIONS

European Search Report dated Jan. 22, 2018 in corresponding European Patent Application No. 17 19 0110, with English translation.

* cited by examiner

CUTTING TOOL

BACKGROUND OF THE INVENTION

1. Field of the Invention

The invention concerns a cutting tool for producing a narrow trench in the ground for laying cables or the like, comprising a carrier device which has a hub region for connecting the cutting tool to a rotary drive and a peripheral region, wherein arranged in the peripheral region of the carrier device are cutting segments spaced from each other in the axial direction. The invention further concerns a laying machine for laying cables or the like in the ground and a process for producing a cutting tool.

The field of use of the cutting tools of the general kind set forth is "micro-trenching" for laying cables or the like, wherein the addition "or the like" is used to denote material to be laid, which involves similar dimensions and properties as cables, like for example flexible casing means, pipes or lines. The basic idea involved in micro-trenching is that, for laying the cable in a highway, the highway does not have to be opened up over a large area, but only a narrow trench is cut in the highway, in which the cable or cables is or are laid, and then the trench is closed again. There are already laying machines which combine all three functions in one unit. In that way hundreds of meters of cable can be laid in the highway per day.

2. Description of the Related Art

Cutting tools are disclosed for example in WO 2012/102659 A1. Those cutting tools are made up of a plurality of cutting blades and support structures arranged therebetween, wherein the support structures, besides the supporting function, provide a canalization system for cooling water, which passes an axially supplied cooling water outwardly to the cutting region.

A problem with the cutting tools disclosed in WO 2012/102659 A1 is that they are of a very complex structure which involves high costs. At the same time the complexity of the structure also increases the susceptibility to wear, whereby the cutting tools have to be replaced more frequently, which has a detrimental effect on the service life of the cutting tools. Finally, the complicated structure of the cutting tools also has an adverse effect on the stability thereof, which leads to a reduced cutting performance in particular in hard grounds. In addition it has been found in practice that the structure of a saw blade set in accordance with WO 2012/102659 A1, wherein the saw blades are connected together there for example by adhesive and/or bolts, does not satisfy the high forces which occur in operation and the individual blades loosen from each other or are pressed apart by rock and stone particles which penetrate between the blades.

SUMMARY OF THE INVENTION

The technical object of the present invention is to overcome the disadvantages of the state of the art and to provide an improved cutting tool which is distinguished in particular by increased stability and service life and which is less expensive to produce. A further object is to provide a laying machine having such a cutting tool as well as a process for producing a cutting tool in a particularly preferred embodiment.

In the case of the cutting tool according to the invention it is therefore provided that the carrier device is in one piece and has a peripheral surface at which are arranged raised portions which project from the peripheral surface in the radial direction and on which the cutting segments are arranged. The carrier device is therefore formed in one piece together with the raised portions.

The stability of the cutting tool is increased, in comparison with a multi-part structure, by virtue of the one-piece configuration of the carrier device. At the same time considerably fewer working steps are required to produce the cutting tool, whereby in comparison with the state of the art the costs are markedly reduced. Any play which is naturally present in a multi-part structure and which leads to wear phenomena is avoided. In particular no relative play can occur between the cutting segments which are spaced from each other in the axial direction as all cutting segments are arranged on the carrier device which is in one piece or on the raised portions which project in the radial direction from the peripheral surface.

Furthermore, in the case of a one-piece structure, there is no possibility of individual blades becoming loosened from each other or being urged apart by rock or stone particles penetrating between the blades.

According to a preferred embodiment it is provided that the raised portions are arranged in at least two rows spaced from each other in the axial direction, preferably wherein the spacing of adjacent rows is 2 mm to 7 mm, particularly preferably about 4.5 mm. In this embodiment therefore not only are the cutting segments spaced from each other in the axial direction, but also the raised portions on which the cutting segments are disposed. In addition the raised portions are arranged in rows. Overall that involves a kind of battlement structure in a cross-sectional view on to the peripheral region.

Embodiments with only two rows but also with three rows or with more than three rows are conceivable, for example with four rows or with five rows. With an increasing number of rows, the thickness of the carrier device or the cutting tool increases, whereby however the demand on the machine performance also increases, so that this entails a natural limit.

In accordance with an advantageous development of the preferred embodiment described hereinbefore it is provided that the raised portions are arranged in at least three rows spaced from each other in the axial direction and wherein the raised portions of the inner row or rows project from the peripheral surface further in the radial direction, preferably by a distance of 1 mm, in relation to the raised portions of the outer rows.

That configuration is advantageous in two respects:

On the one hand this affords a particularly advantageous process for producing that cutting tool, wherein in a first process step firstly cutting segments are arranged, preferably welded, on the raised portions of the inner row or rows, and then in a second process step cutting segments are arranged, preferably welded, on the raised portions of the outer rows. By virtue of the fact that the raised portions of the inner row or rows project further from the peripheral surface in the radial direction with respect to the raised portions of the outer rows, then, when the cutting segments are welded to the raised portions and for that purpose a laser is used, the laser beam is passed beyond the raised portions of the outer rows at a right angle to the raised portions of the inner row or rows, whereby the full laser power can be utilized for the welding operation. It is possible in that way for the raised portions to be fused at the connecting locations in relation to the cutting segments in an efficient fashion.

A further advantage is on the other hand that the first use of a cutting tool of such a design configuration functions in an improved fashion as firstly the cutting segments of the inner row or rows come into contact with the ground, thereby giving an optimized initial cut. In ongoing operation the segments then grind down to an identical height.

If four rows of raised portions or cutting segments disposed thereon are used it is appropriate for the two inner central rows to be raised in relation to the raised portions of the outer rows. In the case of five rows the central row could be raised once again in relation to rows two and four. Overall that always gives a structure which rises stepwise towards the centre, which enjoys the two advantages described.

Even if cooling by means of a cooling fluid is not absolutely necessary it is possible in spite of the one-piece structure of the carrier device, in the case of the cutting tool according to the invention, to provide cooling by means of a cooling fluid, more specifically by the provision of passages for carrying a cooling fluid, preferably cooling water, disposed between the raised portions and the cutting segments arranged thereon.

In the case of a laying machine for laying cables or the like in the ground, wherein the laying machine has at least one such cutting tool, it is appropriate in this connection for it to have at least one source for the delivery of a cooling fluid, preferably cooling water, which is so arranged relative to the at least one cutting tool that the cooling fluid can be delivered in the peripheral region of the at least one cutting tool on to the raised portions and the cutting segments arranged thereon.

BRIEF DESCRIPTION OF THE DRAWINGS

Further details and advantages of the invention will be described more fully hereinafter by means of the specific description with reference to the drawings in which.

DETAILED DESCRIPTION OF THE INVENTION

Figure 1:
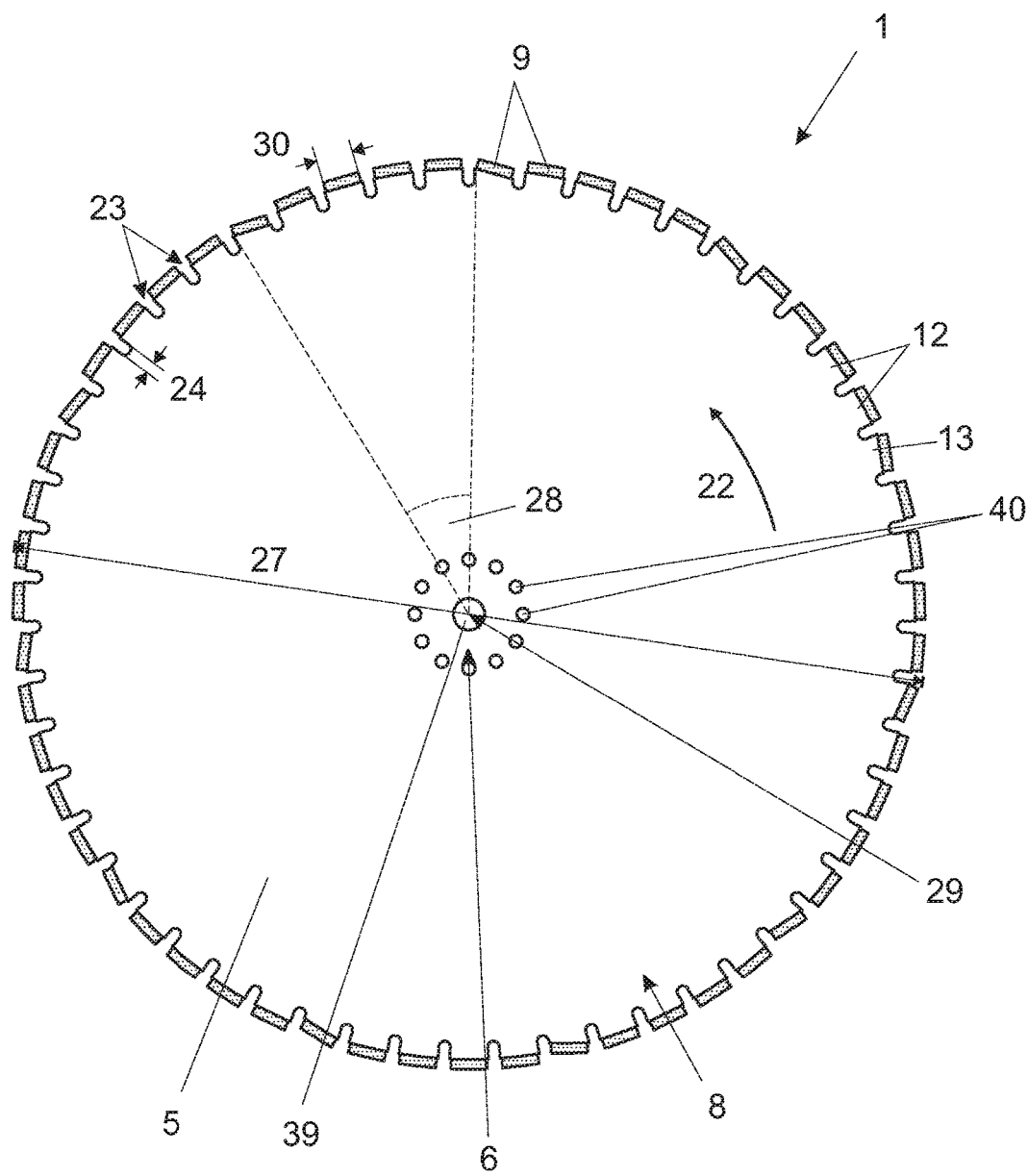
FIG. 1 shows a view on to the side of a preferred embodiment of the cutting tool, FIG. 2 also shows a view from the side on to the central plane of that cutting tool.
Figure 2:
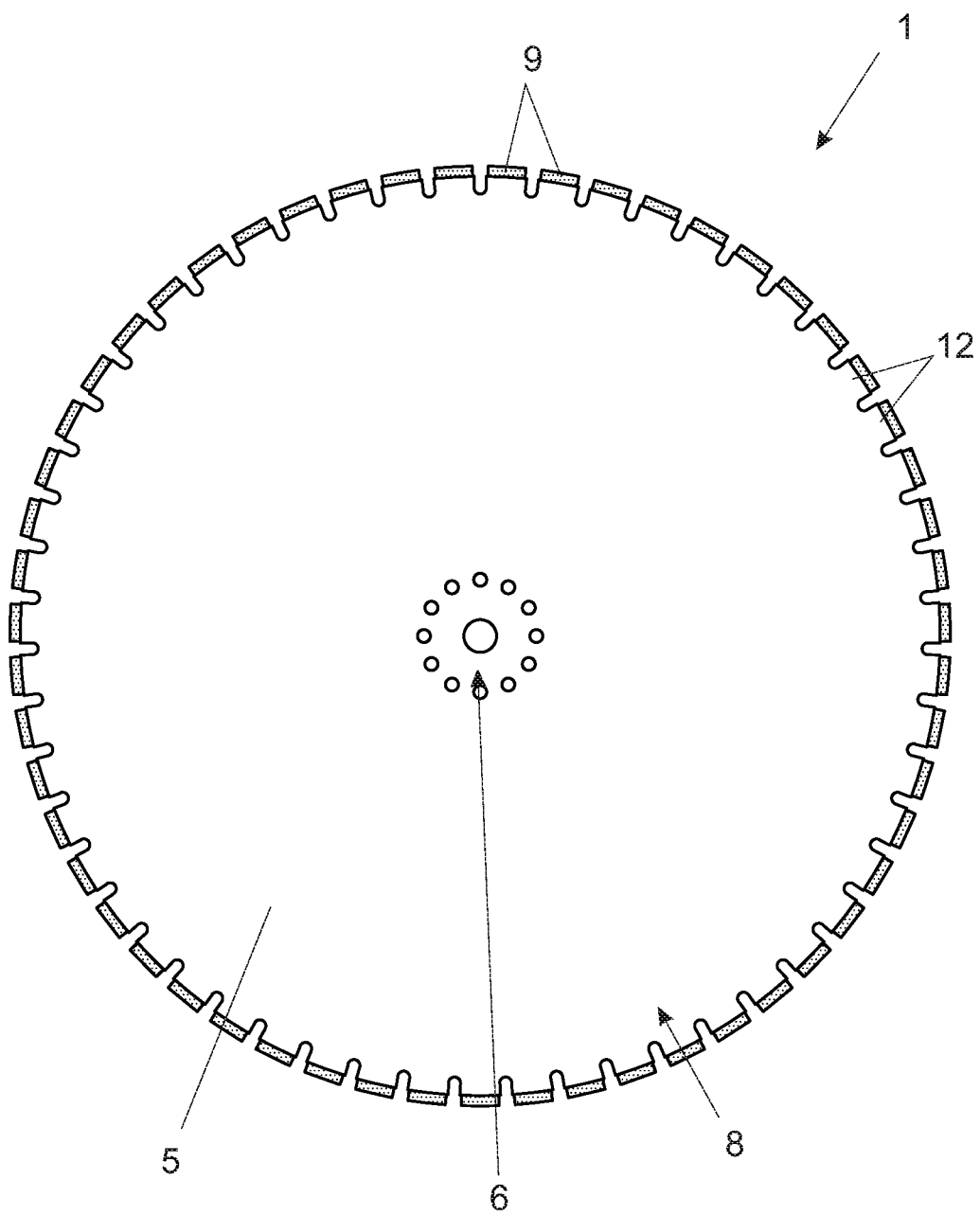
Figure 3:
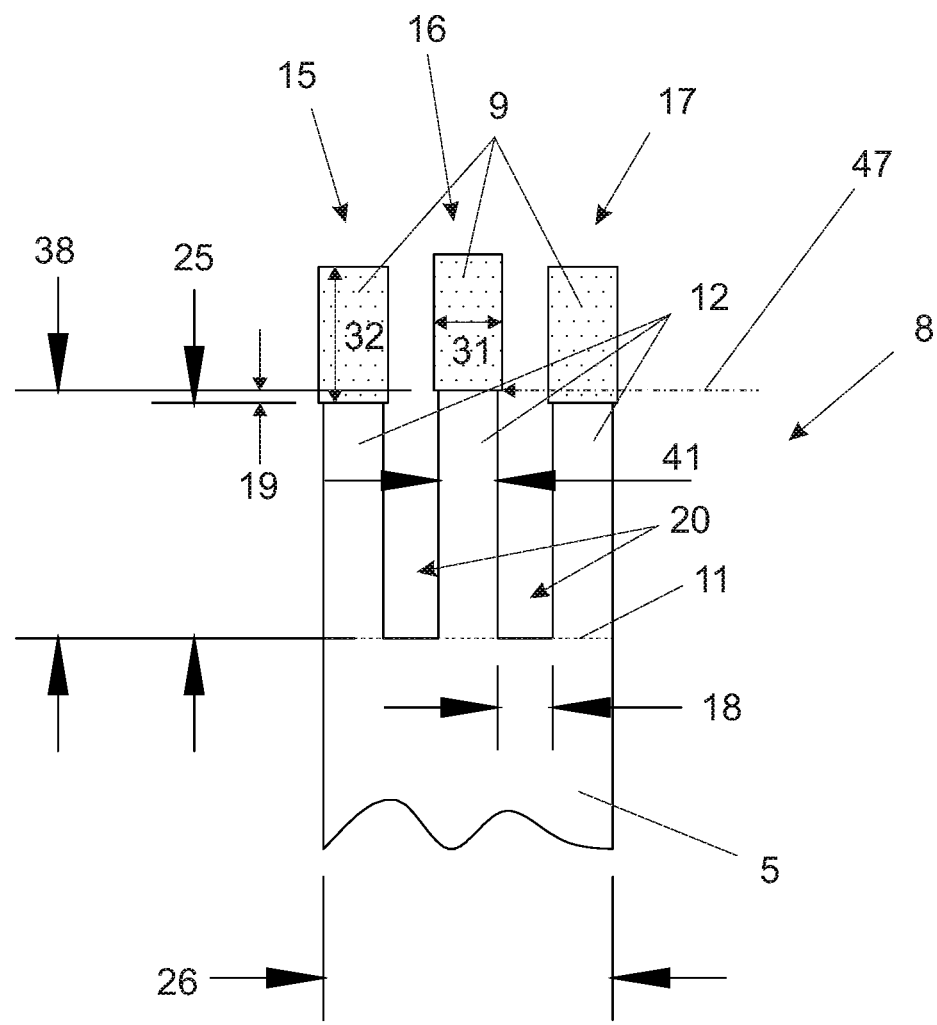
FIG. 3 shows a cross-sectional view of the peripheral region of that cutting tool.
Figure 3:
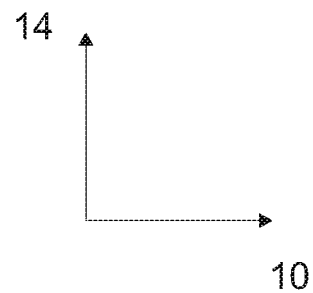

The cutting tool 1 shown in FIGS. 1 to 3, in accordance with a particularly preferred embodiment, includes a carrier device 5 which is made in one piece and which has a hub region 6 for connecting the cutting tool 1 to a rotary drive and a peripheral region 8, wherein arranged in that peripheral region 8 of the carrier device 5 are cutting segments 9 spaced from each other in the axial direction 10 (see FIG. 3). The term "axial direction" is used to mean a direction parallel to the axis of rotation of the cutting tool 1. A direction perpendicular thereto is identified hereinafter as a radial direction 14 (see also the coordinate system shown in FIG. 3).

The cutting segments 9 can be diamond segments.

According to the invention it is provided that the carrier device 5 is in one piece and has a peripheral surface 11 (shown in broken line in FIG. 3), at which there are arranged raised portions 12 and 13 which project in the radial direction 14 from that peripheral surface 11 and on which the cutting segments 9 are arranged.

In the present case the raised portions 12 and 13 are arranged in three rows 15, 16 and 17 (see FIG. 3) which are spaced from each other in the axial direction 10. In this respect FIG. 1 shows a view from the side on to the cutting tool 1, that is to say in this case the rows 16 and 17 respectively are visible. The cutting segments 9 of the central plane which would be seen at the locations of the protective segments (see hereinafter) have been omitted from this view for the sake of clarity. FIG. 2 shows a view on to the central plane also from the side, that is to say in this case the inner central row 16 of raised portions 12 is visible.

The spacing 18 between adjacent rows 15, 16 and 17 is 2 mm to 7 mm, preferably about 4.5 mm.

Provided in the centre 29 of the cutting tool 1 which is of a substantially rotationally symmetrical configuration is a central bore 39 which serves to receive a spindle of a rotary drive.

Provided concentrically around the central bore 39 at regular angular spacings are bores 40, by way of which the cutting tool 1 or the carrier device 5 can be non-rotatably connected to the rotary drive. In the illustrated case the hub region 6 of the carrier device 5 therefore includes a central bore 39 and bores 40 arranged concentrically therearound.

The cutting tool 1 is of a diameter 27 of 700 mm to 1200 mm, preferably about 1000 mm.

The raised portions 12 and 13, on which the cutting segments 9 are arranged, are spaced by slots 23 in a direction of rotation 22 of the cutting tool 1. Those slots 23 are of a width 24 of 2 mm to 20 mm, preferably about 13 mm.

Overall the raised portions 12 and 13 are so arranged on the carrier device 5 that a battlement structure is afforded both in a view from the side and also in the axial direction 10.

The cutting segments 9 are welded to the raised portions 12 and 13.

At certain angular spacings 28 the cutting tool 1 has raised portions 13 which are displaced inclinedly in the direction of the centre 29, or cutting segments 9 disposed thereon. Those "protective segments" are intended to cut free and thus protect the weld locations of the other cutting segments 9. The protective segments are provided only at the two outsides of the cutting tool 1, that is to say in relation to the rows 15 and 17. No such protective segments are required in relation to the inner row 16.

Referring in particular to FIG. 3 it is further to be noted that the raised portions 12 of the inner row 16 project in the radial direction further from the peripheral surface 11, preferably by a distance 19 of 1 mm, in relation to the raised portions 12 and 13 of the outer rows 15 and 17.

It can also be clearly seen that the cutting segments 9 are arranged in a condition of radial prolongation of the raised portions 12 and 13. This means that the cutting segments 9 contact the raised portions 12, 13 with an underside at the outwardly facing surfaces of the raised portions 12, 13.

In addition it can be clearly seen from FIG. 3 that provided between the raised portions 12, 13 and the cutting segments 9 disposed thereon are passages 20 which can be used to carry a cooling fluid.

The raised portions 12, 13, in relation to the peripheral surface 11, are of a height 25 and 38 respectively of 15 mm to 150 mm, preferably about 20 mm.

The carrier device 5 in the axial direction 10 is of a substantially constant thickness 26, wherein the thickness 26 is 10 mm to 40 mm, particularly preferably about 22 mm to 23 mm.

The cutting segments 9 are of a length 30 of 30 mm to 50 mm, preferably about 40 mm (see also FIG. 1), a width 31 of 4 mm to 7 mm, preferably about 5.5 mm, and a height 32 of 5 mm to 15 mm, preferably about 10 mm.

The raised portions 12, 13 are of a width 41 of 3 mm to 8 mm, preferably about 5 mm, in the axial direction 10.

The cutting segments 9 are widened by some tenths of a millimeter in the axial direction in relation to the raised portions 12, 13.

A dash-dotted line in FIG. 3 also indicates a laser beam 47 which in the course of the process 35 for producing the cutting tool 1 (see also FIG. 5) is used in the course of the first process step 36 to firstly weld the cutting segments 9 to the raised portions 12 of the inner row 16. By virtue of the fact that the raised portions 12 of the inner row 16 project in the radial direction 14 further from the peripheral surface 11 in relation to the raised portions 12, 13 of the outer rows 15 and 17, the laser beam 47 can be passed over the raised portions 12, 13 of the outer rows 15 and 17 at a substantially right angle to the weld location as the cutting segments are in fact welded to raised portions 12 and 13 of the outer rows 15 and 17 only in the course of the second process step 37.

Figure 4:
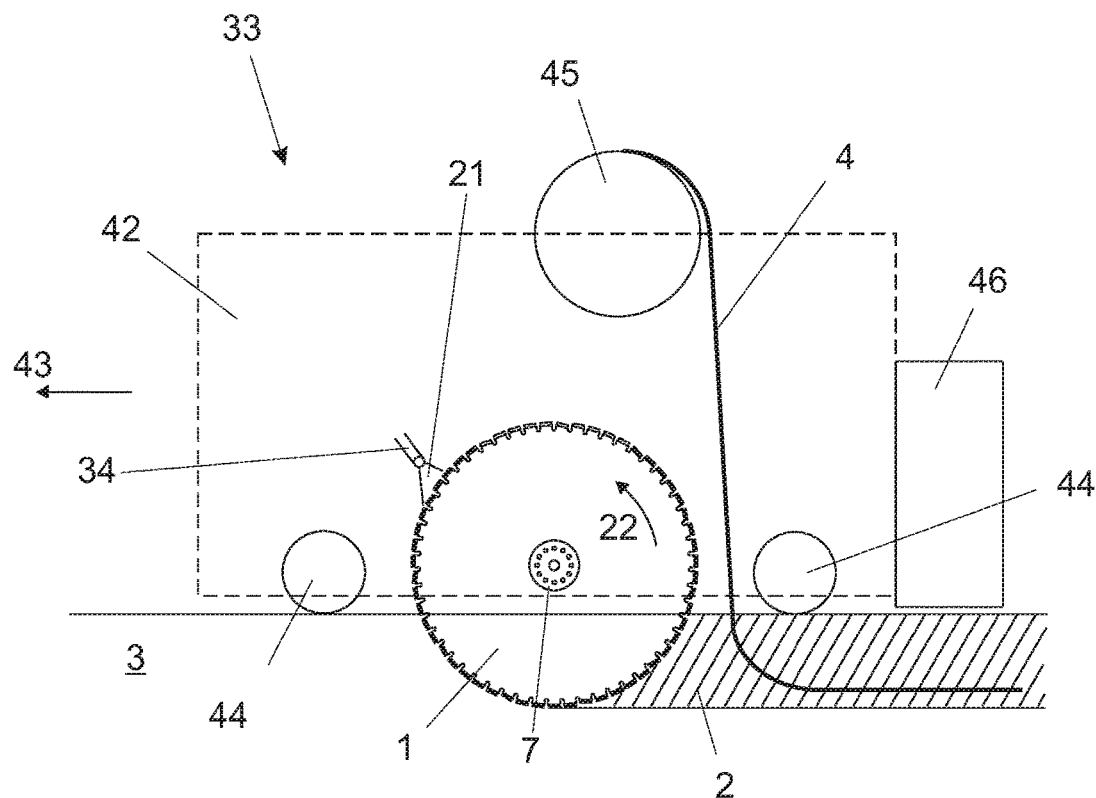
FIG. 4 shows a preferred embodiment of a laying machine according to the invention.

FIG. 4 diagrammatically shows a laying machine 33 for laying cables 4 or the like in the ground 3, wherein the laying machine 33 has a cutting tool 1.

The cutting tool 1 is connected to a rotary drive 7 by way of the hub region of the carrier device, whereby the cutting tool can be caused to rotate in a preferred direction of rotation 22.

The laying machine 33 further has a source 34 for the delivery of a cooling fluid 21 in the form of cooling water, wherein the source 34 is so arranged relative to the cutting tool 1 that the cooling fluid 21 can be directed in the peripheral region of the cutting tool 1 on to the raised portions and the cutting segments disposed thereon. The cooling fluid is then subsequently passed into the passages 20 (see FIG. 3) and serves for cooling the cutting segments 9 and the adjoining regions of the carrier device 5.

The cutting tool 1 contacts the ground 3 in the course of its rotation and cuts or mills a narrow trench 2 in the ground 3. The laying machine 33 can have a collecting arrangement for intermediate storage of the removed ground material.

The laying machine 33 has rollers 44, by way of which the laying machine 33 is supported on the ground 3 and by way of which it can be drivingly moved in an advance direction 43.

The vehicle frame 42 of the laying machine 33 is shown in broken line in FIG. 4.

The laying machine 33 further includes at least one unwinding device 45, from which the cable 4 to be laid can be unwound and laid in the trench 2. It will be appreciated that the laying machine 33 can also include a plurality of unwinding devices 45 and can be adapted to lay a plurality of cables 4 in the trench 2.

And finally the laying machine 33 also has a device 46 for the delivery of concrete or the like, with which the trench 2 can be immediately closed again after the cable has been laid.

Figure 5:
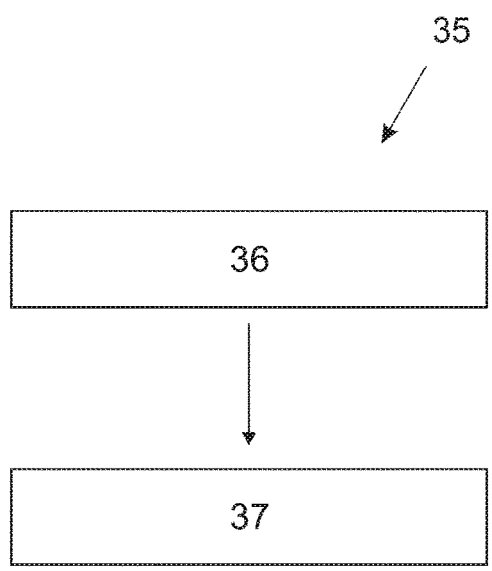
FIG. 5 shows a flow chart to illustrate the process according to the invention for producing the cutting tool.

FIG. 5 shows a flow chart to diagrammatically illustrate the process 35 for producing the cutting tool 1, wherein in a first process step 36 firstly cutting segments 9 are arranged or welded on the raised portions 12 of the inner row 16 and then in a second process step 37 cutting segments 9 are arranged or welded on the raised portions 12 and 13 of the outer rows 15 and 17 (see also FIG. 3).

The invention claimed is:

1. A cutting tool (1) for producing a trench (2) in a ground (3) for laying cables (4), the cutting tool (1) comprising:
    a carrier device (5) which has a peripheral region (8) and a hub region (6) for connecting the cutting tool (1) to a rotary drive (7),
    wherein cutting segments (9) are arranged in the peripheral region (8) of the carrier device (5), the cutting segments (9) being spaced from each other in an axial direction (10),
    wherein the carrier device (5) has a peripheral surface (11) at which raised portions (12, 13) are arranged, the raised portions (12, 13) projecting from the peripheral surface (11) in a radial direction (14) and the cutting segments (9) being arranged on the raised portions (12, 13),
    wherein the carrier device (5) is formed in one piece together with the raised portions (12, 13), and
    wherein the cutting segments (9) are arranged in a condition of radial prolongation of the raised portions (12, 13).

2. The cutting tool (1) according to claim 1, wherein the raised portions (12, 13) are arranged in at least two rows (15, 16, 17) spaced from each other in the axial direction (10).

3. The cutting tool (1) according to claim 2, wherein the raised portions (12, 13) are arranged in at least three rows (15, 16, 17) spaced from each other in the axial direction (10), and wherein the raised portions (12) of an inner row (16) of the at least three rows (15, 16, 17) project from the peripheral surface (11) further in the radial direction (14) than the raised portions (12, 13) of outer rows (15, 17) of the at least three rows (15, 16, 17).

4. The cutting tool (1) according to claim 1, wherein arranged between the raised portions (12, 13) and the cutting segments (9) arranged thereon are passages (20) for carrying a cooling fluid (21).

5. The cutting tool (1) according to claim 1, wherein the cutting segments (9) are welded to the raised portions (12, 13).

6. The cutting tool (1) according to claim 1, wherein the raised portions (12, 13) are spaced from each other by slots (23) in a direction of rotation (22) of the cutting tool (1).

7. The cutting tool (1) according to claim 1, wherein the raised portions (12, 13) are of a height (25, 38) of 15 mm to 25 mm.

8. The cutting tool (1) according to claim 1, wherein the carrier device (5) is of a substantially constant thickness (26) in the axial direction (10).

9. The cutting tool (1) according to claim 1, wherein the cutting tool (1) is of a diameter (27) of 700 mm to 1200 mm.

10. The cutting tool (1) according to claim 1, wherein some of the raised portions (13) are displaced inclinedly in a direction of a centre (29) at angular spacings (28) and some of the cutting segments (9) are arranged thereon.

11. The cutting tool (1) according to claim 1, wherein the cutting segments (9):
    are of a length (30) of 30 mm to 50 mm, and/or
    are of a width (31) of 4 mm to 7 mm, and/or
    are of a height (32) of 5 mm to 15 mm.

12. A laying machine (33) for laying cables (4) in a ground (3), wherein the laying machine (33) has at least one cutting tool (1) according to claim 1.

13. The laying machine (33) according to claim 12, wherein the laying machine (33) has at least one source (34) for delivery of a cooling fluid (21), which is arranged relative to the at least one cutting tool (1) such that the cooling fluid (21) can be delivered in the peripheral region (8) of the carrier device (5) onto the raised portions (12, 13) and the cutting segments (9) arranged thereon.

14. A process (35) for producing the cutting tool (1) according to claim 3, wherein in a first process step (36) some of the cutting segments (9) are arranged on the raised portions (12) of the inner row (16) of the at least three rows (15, 16, 17), and then in a second process step (37) some of the cutting segments (9) are arranged on the raised portions (12, 13) of the outer rows (15, 17) of the at least three rows (15, 16, 17).

15. The cutting tool (1) according to claim 2, wherein passages (20) for carrying a cooling fluid (21) are arranged between the raised portions (12, 13) and the cutting segments (9) arranged thereon.

16. The cutting tool (1) according to claim 3, wherein passages (20) for carrying a cooling fluid (21) are arranged between the raised portions (12, 13) and the cutting segments (9) arranged thereon.

17. The cutting tool (1) according to claim 2, wherein the cutting segments (9) are welded to the raised portions (12, 13).

18. The cutting tool (1) according to claim 3, wherein the cutting segments (9) are welded to the raised portions (12, 13).

19. The cutting tool (1) according to claim 4, wherein the cutting segments (9) are welded to the raised portions (12, 13).

20. The cutting tool (1) according to claim 15, wherein the cutting segments (9) are welded to the raised portions (12, 13).

* * * * *